April 29, 1969
M. BEUKER
3,440,975
OVENS
Filed Oct. 22, 1965
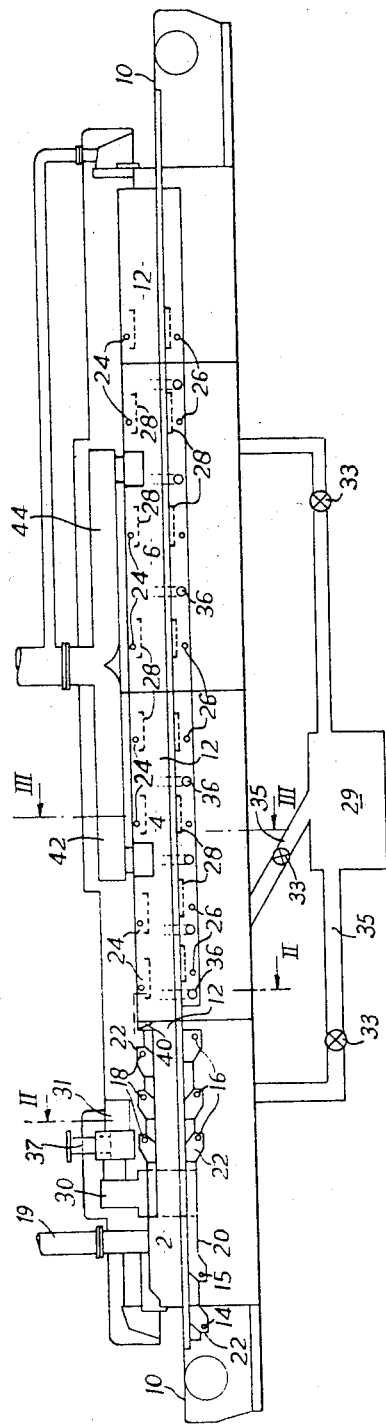
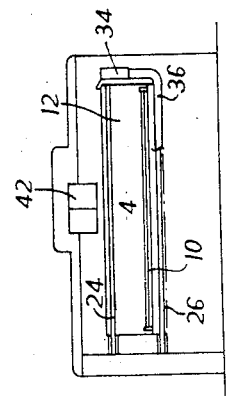
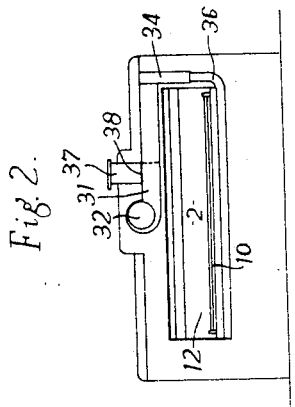
INVENTOR
MARTINUS BEUKER,
BY
Woodhams, Blanchard & Fly
ATTORNEYS

United States Patent Office 3,440,975
Patented Apr. 29, 1969

3,440,975
OVENS
Martinus Beuker, Shirley, Croydon, Surrey, England, assignor to Winkler-Atlas Manufacturing Limited, Croydon, Surrey, England
Filed Oct. 22, 1965, Ser. No. 501,829
Claims priority, application Great Britain, Jan. 8, 1965, 1,005/65
Int. Cl. A21b 1/02, 1/06; F27b 9/00
U.S. Cl. 107—54                                11 Claims

ABSTRACT OF THE DISCLOSURE

A method and an apparatus for producing baked articles, said apparatus comprising a tunnel oven having a plurality of consecutive chambers therein. The articles to be baked are conveyed through the successive chambers of the oven, the first chamber being heated indirectly by the combustion of gaseous fuel. Hot combustion gases from the first chamber are fed into a subsequent chamber for contacting the articles as they pass therethrough.

---

This invention relates to ovens and particularly to tunnel ovens.

Tunnel ovens, comprising an elongated tunnel through which the articles to be heated are passed on a conveyor, are well known and widely used, for example in bakeries. Such ovens are generally heated directly by gas burners mounted within the tunnel, and in the operation of such ovens it has been found advantageous to employ a system of forced convection to promote heat transfer, chamber gases, including air and combustion gases, being extracted from the exit end of the tunnel and reintroduced at the entrance. It is frequently found necessary, however, to re-heat the extracted gases before re-introducing them into the oven and this increases the running cost of the apparatus.

It has now been found that forced convection can be employed more economically to give more efficient and even heat transfer if the oven is constructed so that hot, substantially undiluted combustion gases can be fed into the tunnel.

Accordingly the present invention provides an oven comprising an elongated tunnel constituted by an entrance chamber and at least one further chamber communicating therewith, means for conveying articles through the tunnel, a first gas burner or burners mounted within a heating jacket for the entrance chamber for indirectly heating the entrance chamber by the combustion of gaseous fuel, means for heating the further chamber or chambers and means for extracting combustion gases from the said heating jacket and introducing them directly into the further chamber or at least one of the further chambers.

The invention also provides a method of producing a baked article comprising conveying the articles to be baked through a tunnel oven having a plurality of consecutive zones wherein the article is heated, the first of the zones through which the article is conveyed being heated indirectly by the combustion of gaseous fuel, hot undiluted combustion gases thereby produced being fed into at least one of the subsequent zones into contact with the article or articles passing therethrough.

The further chamber or chambers are preferably heated directly by further gas burners mounted within the tunnel, screens being provided to protect articles passing through the further chamber or chambers from excessive direct radiation whilst allowing the substantially free flow of combustion gases to promote convection heat transfer. The combustion gases employed for indirectly heating the first zone of the oven are preferably injected into the remainder of the oven from below the baking articles, although they may also be injected from above.

The invention will now be further described, by way of example, with reference to the accompanying drawings, in which:

FIG. 1 is a side elevation, partly in section, showing parts of a preferred oven according to the invention, suitable for use in the baking of dough, etc., FIG. 2 is a section along the lines II—II of FIG. 1, and FIG. 3 is a section along the lines III—III of FIG. 1.

Referring now to FIG. 1 of the drawings there is shown a tunnel oven having an entrance chamber 2 and two consecutive further chambers 4 and 6 communicating therewith. An endless conveyor 10 is provided for conveying articles to be baked through the continuous tunnel 12 formed by the communicating chambers.

The entrance chamber 2 is heated indirectly by gas burners 14, 15, 16 and 18 mounted in a heating jacket 20 surrounding the chamber. The burner 14 is positioned below the conveyor 10 at the feed end of the oven for pre-heating the conveyor and the burner 15 is situated beneath the steaming section of the oven to prevent excessive cooling during continuous steaming. The burners 16 and 18 are mounted respectively below and above the conveyor 10. The burners 14, 15, 16 and 18 are preferably ribbon flame bar gas burners and extend across the width of the chamber in channels 22 in jacket 20, the said burners thus being completely separated from the baking area by jacket 20 to ensure proper control of the steam condition at the oven entry. Excess steam evolved in chamber 2 of the oven is controllably vented through stack 19.

The second and third chambers or zones 4 and 6 are directly heated by flame bar gas burners 24 and 26 situated respectively above and below the conveyor 10. Baking articles conveyed through these zones are protected against excessive direct radiation by screens 28 mounted adjacent to each burner. The screens 28 are constructed and arranged to provide in operation a radiating surface at a relatively low temperature so that the baking articles are subjected to mild radiation whilst the combustion gases from gas burners 26 are allowed to move freely through the baking chamber to give good natural convection heat transfer.

As indicated diagrammatically in FIGURE 1, the gas burners 14, 15, 16, 18, 24 and 26 are supplied with gaseous fuel from a source 29 through pipes 35, the supply to each zone being controlled by respective motorized valves 33. The sets of burners within each of the chambers 2, 4 and 6 are each supplied with gas through one of the pipes 35 with the supply of gas to each of the individual chambers being individually controlled by means of the specific motorized valve 33 contained within the individual pipes 35.

Each of the zones 2, 4 and 6 is provided with a thermostat which controls the motorized valve 33 incorporated in each fuel supply pipe 35 for the burners in the zone, so that the temperature of each zone may be independently and accurately controlled to give the desired baking curve. In one embodiment each thermostat is an electrical contact thermometer which, when the temperature in the zone reaches a predetermined maximum or minimum, energizes a relay to actuate the associated motorized valve for respectively decreasing or increasing the flow of gas to the burners of the zone. Each motorized valve is a conventionally commercially obtainable unit incorporating a limit switch which automatically deactuates the motor of the valve as soon as the valve has been opened or closed to a predetermined degree. The gas burners in the zone may be controlled by a motorized valve 33, as shown in FIGURE 1.

As shown more clearly in FIGS. 2 and 3 the heating jacket 20 of chamber 2 has an outlet conduit 30 communicating by way of conduit 31 with a flue 37 and/or with a feed duct 34 which runs along the length of the chambers 4 and 6, depending upon the position of the member 38 which may be adjusted to close the entrance to either the flue or the feed duct. Mounted in the outlet conduit 30 is a fan 32 for drawing combustion gases from the jacket 20. When the feed duct 34 is open, forced convection in either or both of chambers 4 and 6 is obtained, the fan blowing the extracted combustion gases into the feed duct 34 and thence through a number of injection tubes 36 into the tunnel 12. The injection tubes 36 are distributed along the length of the duct 34 and each is provided with perforations to ensure even distribution of the hot combustion gases into the chambers 4 and 6. Each injection tube is equipped with a valve to permit adjustment of the degree of forced convection.

In a wall of the jacket 20 is mounted a vane 40 adjustable to bring the jacket 20 into communication with the chamber 4 on a level with the burners 24. Should it be necessary in a particular baking process for the burners within the jacket 20 to be turned down so that insufficient combustion gas is produced to maintain the required degree of forced convection, the vane 40 may be opened so that additional combustion gases are drawn into the jacket to supplement those produced by the burners 14, 15, 16 and 18.

If forced convection is not required the feed duct 34 may be closed and the combustion gases from the jacket 20 expelled through flue 37.

Ducts 42 and 44 are provided at the centre of chambers 4 and 6 respectively above the conveyor surface for the continuous extraction of chamber gases when the oven is in operation. Each duct is equipped at the inlet end with a fan adjustable, according to whether or not forced convection is employed, to maintain the required rate of extraction of chamber gases.

The particular oven described above with reference to the accompanying drawings is divided into three chambers or zones, but it is to be understood that ovens according to the invention may be constructed having two, four, five or more zones. Furthermore the number and relative distribution of the gas burners and forced convection injection pipes along the length of the tunnel may be selected according to the particular purpose for which the oven is intended and according to the heat requirements of the top and the bottom of the article being baked.

The length of the entrance chamber is generally 10 to 12 feet, the remainder of the oven being divided into substantially equal zones.

The rating of the burners is preferably based on the maximum requirements and they are adjustable to 30% of their maximum output by means of a valve. To achieve a flexible oven the burners should preferably be 15% overrated.

What is claimed is:

1. A tunnel oven comprising first wall structure defining an elongated tunnel-shaped entrance chamber and second wall structure defining a further tunnel-shaped chamber, said entrance and further chambers being mounted in communicating contiguous relationship to form an open-ended tunnel; conveying means disposed within said tunnel and traveling through said tunnel in the elongated direction of said entrance chamber and in a direction away from said entrance chamber; heating means for heating said further chamber; indirect heating means for solely indirectly heating said elongated entrance chamber so as to provide all of the heat required for said entrance chamber and thereby minimize turbulence therein, said indirect heating means comprising further wall structure defining a hollow jacket mounted in heat-exchanging relationship with said elongated entrance chamber, and means for providing in said jacket hot combustion gases from the combustion of gaseous fuel, said hot gases heating said heating jacket so as to indirectly heat said entrance chamber while said jacket prevents said hot combustion gases from entering said entrance chamber; duct means directly connnecting said jacket to said further tunnel-shaped chamber; and feeding means for feeding said hot combustion gases directly from said jacket into said further tunnel-shaped chamber through said duct means.

2. A tunnel oven according to claim 1 wherein said heating means for said further tunnel-shaped chamber includes gas burners mounted in said further chamber, a source of combustible gas, pipe means feeding said gas burners from said source, and control means for controlling the supply of said combustible gas to said gas burners.

3. A tunnel oven according to claim 1, wherein said duct means directly connecting said jacket to said further tunnel-shaped chamber is in communication with the lower portion of said further chamber for feeding said hot gases into said further chamber below said conveying means.

4. A tunnel oven comprising first wall structure defining a first tunnel-shaped chamber and second wall structure defining a plurality of further tunnel-shaped chambers, said chambers being mounted in communicating contiguous relationship to constitute an open-ended tunnel; conveying means disposed within said tunnel and traveling through said tunnel in a direction away from said first chamber; heating means for heating said further chambers, said heating means including respective sets of gas burners mounted in said further chambers, a source of combustible gas, pipe means feeding said gas burners from said cource, and control means for individually controlling the supply of said combustible gas to each of said sets of gas burners; indirect heating means providing all of the heat required for said first chamber, said indirect heating means comprising further wall structure defining a hollow jacket mounted in heat-exchanging relationship with said first chamber, means for providing in said jacket hot combustion gases from the combustion of gaseous fuel, said hot gases indirectly heating said first chamber; duct means directly connecting said jacket to at least one of said further tunnel-shaped chambers; and feeding means for feeding said hot combustion gases directly from said jacket into at least one of said further tunnel-shaped chambers through said duct means.

5. A tunnel oven comprising first wall structure defining a first tunnel-shaped chamber and second wall structure defining a second tunnel-shaped chamber, said first and second chambers being mounted in communicating contiguous relationship to form an open-ended tunnel; conveying means disposed within said tunnel and traveling through said tunnel; indirect heating means providing all of the heat required for said first chamber, said indirect heating means comprising further wall structure defining a hollow jacket mounted in heat-exchanging relationship with said first chamber, means for providing in said jacket hot combustion gases from the combustion of gaseous fuel, said hot gases indirectly heating said first chamber; duct means directly connecting said jacket to said second chamber; feeding means for feeding said hot combustion gases directly from said jacket into said second tunnel-shaped chamber through said duct means; heating means for directly heating said second tunnel-shaped chamber comprising gas burners mounted in said second chamber, a source of combustible gas and pipe means feeding said burners from said source; and means for selectively permitting hot combustion gases to be drawn from said gas burners into said jacket.

6. A tunnel oven comprising first wall structure defining a first tunnel-shaped chamber and second wall structure defining a plurality of further tunnel-shaped chambers, said chambers being mounted in communicating contiguous relationship to constitute an open-ended tunnel; conveying means disposed within said tunnel; indirect heating means providing all of the heat required for said first chamber, said indirect heating means comprising further wall structure defining a hollow jacket mounted in heat-exchanging relationship with said first chamber, means for providing in said jacket hot combustion gases from the combustion of gaseous fuel, said hot gases indirectly heating said first chamber; duct means directly connecting said jacket to at least one of said further tunnel-shaped chambers; feeding means for feeding said hot combustion gases directly from said jacket into at least one of said further tunnel-shaped chambers through said duct means; heating means for directly heating said second tunnel-shaped chamber comprising gas burners mounted in said second chamber, a source of combustible gas and pipe means feeding said burners from said source; and means cooperating with said feeding means for selectively permitting hot combustion gases to be drawn from said gas burners into said jacket.

7. A process comprising passing articles to be baked through at least three contiguous baking zones constituted by a first baking zone and a plurality of further baking zones, heating said first zone wholly indirectly with first hot combustion gases from the combustion of gaseous fuel, directly heating said further zones by the combustion therein of gaseous fuel to produce second hot combustion gases, feeding said first hot combustion gases directly into at least one of said further zones into direct contact with baking articles therein, and selectively drawing said second hot combustion gases directly from said further zones into indirect heat-exchanging relationship with said first zone whenever it is necessary to supply additional combustion gases to said first zone.

8. A tunnel oven according to claim 5 including perforate screen means mounted in said second tunnel-shaped chamber between said gas burners and said conveying means.

9. A tunnel oven comprising wall structure defining an open-ended tunnel having an entrance portion and a remaining portion; conveyor means disposed in said tunnel and traveling through said tunnel from said entrance portion; indirect heating means providing all of the heat required for said entrance portion, said indirect heating means comprising further wall structure defining a jacket mounted in heat-exchanging relationship to said entrance portion, first gas burners mounted in said jacket, a source of gaseous fuel and pipe means feeding said first gas burners from said source, said gaseous fuel being ignited at said first gas burners to produce in said jacket hot combustion gases to indirectly heat said entrance portion; conduit means directly connecting said jacket to said remaining portion of said tunnel; extractor means for extracting said combustion gases from said jacket and passing them directly into said remaining portion through said conduit means; further gas burners mounted within said remaining portion of said tunnel, a source of gaseous fuel and pipe means feeding said further gas burners from said source, said gaseous fuel being ignited at said further gas burners to produce further hot combustion gases in said remaining portion of said tunnel; perforate screen means disposed between said further gas burners and said conveyor means, said screen means permitting essentially free flow of said further hot combustion gases from said further gas burners therethrough and at least partially shielding said conveyor means from direct radiation from said further gas burners; and means cooperating with said extractor means for selectively drawing a portion of said further hot combustion gases from said remaining portion of said tunnel directly into said jacket.

10. In a method of continuous baking by conveying articles to be baked through first and second contiguous baking zones, the improvement which comprises heating said first baking zone wholly indirectly with hot combustion gases from the combustion of gaseous fuel, feeding said hot combustion gases from said first baking zone directly into said second baking zone, directly heating said second zone by the combustion therein of gaseous fuel to produce further hot combustion gases, and selectively drawing hot combustion gases from said second baking zone into indirect heat-exchanging relationship with said first baking zone whenever it is necessary to supply additional combustion gases to said first baking zone.

11. A continuous baking process comprising conveying articles to be baked to an elongated entrance baking zone contiguous with a further baking zone, heating said articles in said elongated entrance zone wholly indirectly with hot combustion gas from the combustion of gaseous fuel, preventing said hot combustion gases from entering into said entrance baking zone so that said hot combustion gases do not directly contact said articles; passing said hot combustion gases directly into said further baking zone so as to heat said articles therein by direct contact, supplying further hot combustion gases to said further baking zone by the combustion therein of gaseous fuel, and additionally directly heating said articles in said further baking zone by direct contact of said articles by said further hot combustion gases.

References Cited

UNITED STATES PATENTS

| 2,767,667 | 10/1956 | Spooner | 107—55 X |
| 2,767,668 | 10/1956 | Spooner | 107—55 X |

WALTER A. SCHEEL, *Primary Examiner.*

J. SHEA, *Assistant Examiner.*

U.S. Cl. X.R.

107—55, 63; 263—28